Patented Nov. 8, 1949

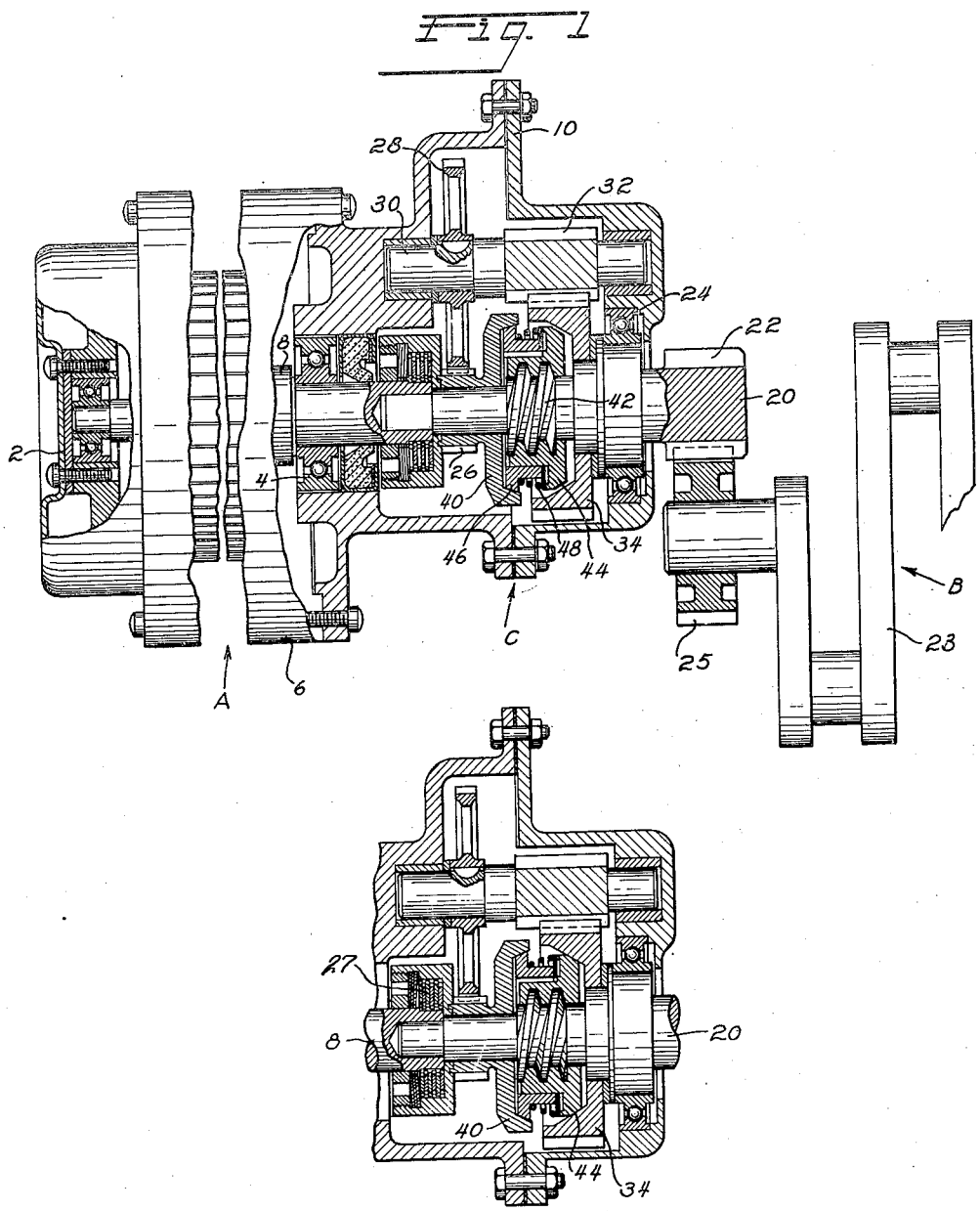

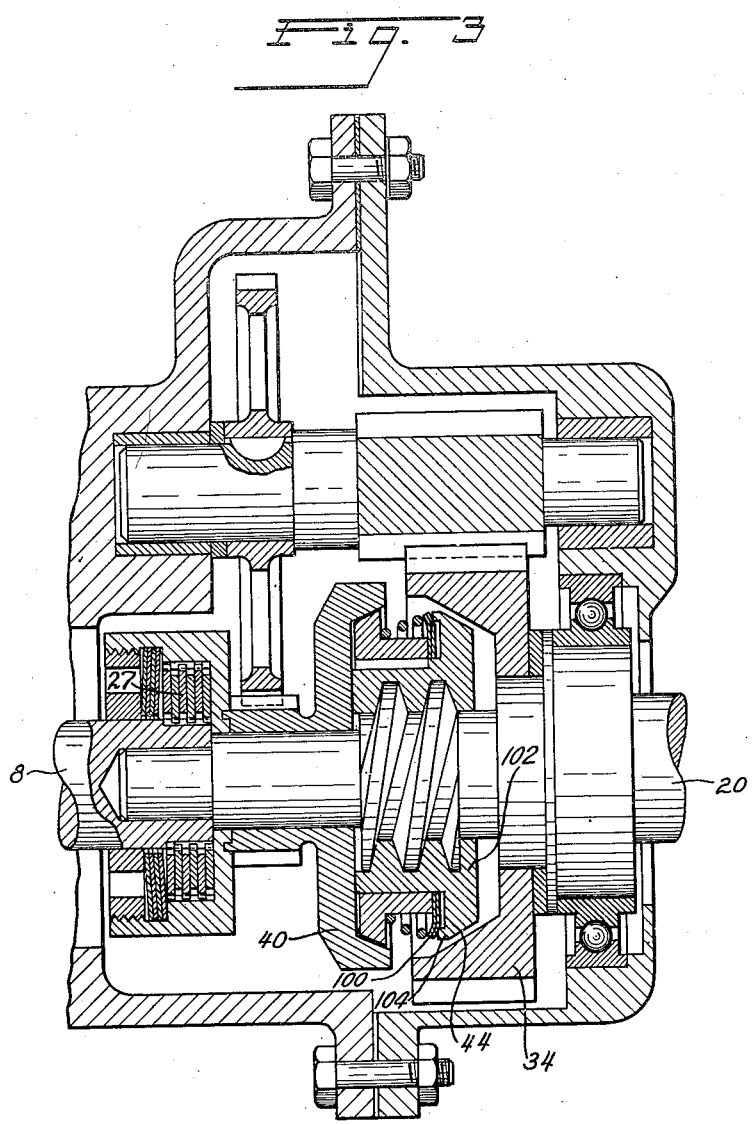

2,487,460

UNITED STATES PATENT OFFICE 2,487,460

STARTER-GENERATOR FOR INTERNAL-COMBUSTION ENGINES

Gerhard Mauric, Los Angeles, Calif., assignor to Electrical Engineering and Manufacturing Corporation, Los Angeles, Calif., a corporation of California Application August 6, 1946, Serial No. 688,645

6 Claims. (Cl. 74—810)

1

This invention relates in general to devices and systems for starting an internal combustion engine and for generating electric energy during the operation of the engine and by power derived therefrom.

Combined starting and generating devices for use with internal combustion engines are now well known. These devices comprise, in general, an electric machine and gearing connecting the machine to the crankshaft of an internal combustion engine, the gearing being operable to effect a speed reduction when the electric machine is driving the crankshaft to start the engine, and being operable to cause the electric machine to be driven at a suitable speed when the engine has started and is driving the electric machine as a generator. The invention more particularly relates to a combined starter and generator device of the general type and construction of that described and claimed in the patent to Mauric et al., No. 2,466,461, issued April 5, 1949.

It has been proposed, and is known, to provide starter-generator devices with means to protect the device upon backfiring of the engine. This invention has been concerned with the provision of such safeguards to starter-generators of the type described and claimed in the aforesaid copending application and has had for one of its principal objects the provision of means for protecting the reduction gearing and the electric machine of such devices from damage due to back-firing during starting of the engine and also during or after stopping of the engine. In addition, it has been an object of the invention to provide means incorporated into the reduction gearing of such devices for limiting the output of the electric machine when acting as a generator in order to prevent damage thereto in the event of heavy overload of the electrical system supplied by the generator such as, for example, might be caused by a short-circuit occurring in the electrical system of an aircraft.

All of these objects and others inherent in the invention have been realized by this invention and are incorporated in an embodiment thereof which is disclosed in the following description and the annexed drawings. The disclosure of this preferred embodiment is for purposes of illustration of the invention only, and imposes no limitations on the invention not imposed by the appended claims.

Referring to the drawings, in which similar reference numerals refer to like parts, Fig. 1 is part-sectional view showing, partly

2 schematically, an internal combustion engine, an electric machine which is operable to start the engine and is also operable as a generator, and also showing in more detail the power-transmitting mechanism including the backfire and overload protection means provided by this invention, the parts being shown in the position occupied just before the engine is started;

Fig. 2 is a view showing the power-transmitting mechanism with the parts in the position occupied when the engine is being started, and Fig. 3 is a view showing the operation of the backfire and overload protection means.

This invention has particular application to starter-generator devices of the type disclosed in the aforesaid copending application and one of such devices is disclosed in this application. This device comprises an electric machine A, an internal combustion engine B and a power-transmitting mechanism C which is operable to connect the armature of the machine A to the crankshaft of the engine B. The mechanism C is so operable that when the machine A is operated as a motor the engine crankshaft will be rotated, in order to start the engine, at a speed less than that of the armature of machine A, and is also so operable that when the engine starts and is running under its own power the armature of the electric machine will be rotated at a suitable speed to cause such machine to generate electric energy. The electric machine is preferably of the usual structure of a motor or generator, comprising a stator and a rotating armature supported in bearings 2, 4 and being enclosed in a casing 6. The end of the armature shaft 8 adjacent bearing 4 extends into a housing 10 which is attached to the end of the dynamo casing and within which the power-transmitting mechanism C is housed.

The power-transmitting mechanism comprises a rotatable shaft 20 one end of which is freely and rotatably journaled in a recess in the end of armature shaft 8 and the other end of which is external to casing 10 and is provided with a pinion gear 22 which is operably connected to the crankshaft 23 of the internal combustion engine B through means external to the housing 10, such as the timing gear 25. Intermediate its ends the shaft 20 is supported by bearing 24 in the wall of housing 10. Within housing 10 and adjacent the end of the armature shaft 8 a pinion gear 26 is freely and rotatably mounted on shaft 20 and is in mesh with a gear 28 which is keyed to a jack-shaft 30, which also comprises a pinion gear 32 which is in mesh with a gear 34 which is freely and rotatably mounted on shaft 20. It will be apparent that the gear train 26, 28, 32, 34 will provide a speed reduction whereby rotation of pinion gear 26 will cause gear 34 to be rotated at a speed less than that of the pinion gear.

The rotation of the armature shaft 8 and pinion 26 is transmitted to shaft 20 through the described reduction gearing and, when the engine C is running, the rotation of crankshaft 23 and shaft 20 are directly transmitted to pinion 26 and the armature shaft without the interposition of the reduction gearing. The means for effecting this comprise a disc 40 which is rigidly connected to pinion gear 26 and has an internal frusto-conical clutch surface. This part is referred to in this application as the "pinion disc." A similar internal, frusto-conical surface is formed on gear 34 and faces the cone surface on the pinion disc. Between the pinion disc and gear 34 the shaft 20 has a quick-action thread 42 formed thereon to receive the correspondingly threaded sleeve of a "cone nut" 44 having a frusto-conical surface facing the cone surface on gear 34 and adapted to be moved into and out of engagement therewith by relative rotation of shaft 20 and the cone nut. A second cone nut 46 surrounds the sleeve of cone nut 44 and is keyed thereto whereby it must rotate therewith but can move axially thereof. This cone nut 46 has a frusto-conical surface facing that on the pinion disc 40 and is normally held in engagement therewith by a coil compression spring 48 surrounding the cylindrical sleeves of the two cone nuts.

The operation of this mechanism, all of which is disclosed in the aforesaid co-pending application, will now be described. Assuming that all of the parts are at rest and that it is desired to start the internal combustion engine B, the parts will be found in the positions shown in Fig. 1, and current may be applied to the motor-generator A to operate the same. The rotation of armature shaft 8 will be transmitted to pinion gear 26, causing rotation of gear 34 through the reduction gearing. Until this time shaft 20 will be held from rotation by the inertia of the internal combustion engine B, the clutch surface on cone nut 46 will be in engagement with the corresponding surface of pinion disc 40, and the clutch surfaces on cone nut 44 and gear 34 will be separated, having been left in such condition on the earlier stopping of the engine. Rotation of pinion gear 26 will be transmitted through friction surfaces 40 and 46 to nut 44, causing it to move axially along the threads 42 into contact with gear 34. Rotation of gear 34 will now cause cone nut 44 to tighten against gear 34, thus locking these two parts together and causing the rotation of gear 34 to be transmitted to shaft 20. The crankshaft of the engine will therefore be rotated at the reduced speed provided by the reduction gearing thus starting the engine. The relation of parts is such that any rotation imparted to cone nut 46 by the pinion disc at this time will tend to cause the two cone nuts to move to the right on shaft 20 by reason of which there is no direct transmission of rotation from pinion 26 to shaft 20, such shaft being rotated only through the reduction gearing. The parts are in the position shown in Fig. 2 at this time.

When the engine starts and is running under its own power it will rotate shaft 20 in the same direction as such shaft was rotated during the starting operation, but at a higher speed. This will cause relative rotation to take place between shaft 20 and cone nut 44 which will cause the cone nut to run up the threads 42 in a direction away from gear 34, thus relieving the connection between these parts and compressing the coil spring 48. The clutch surface on the second cone nut 46 will therefore be forced into tight engagement with the corresponding surface on pinion disc 40, whereby the rotation of the engine crankshaft and shaft 20 will be transmitted through threads 42, cone nuts 44 and 46, pinion disc 40, pinion 26 and torque limiter 27 to the shaft 8 of the starter-generator A, operating the same as a generator. The gear 34 is disconnected from shaft 20 by movement of the cone nut 44 away from it, and the reduction gearing 28, 30, 32, 34 merely idles when the engine drives the generator. The parts are in the position shown in Fig. 1 at this time.

During starting the motor-generator A is energized and transmits torque to the gear train 26, 28, 32, 34, keeping the cone nut 44 engaged with gear 34. In the event of backfire during this operation the engine B will stop against compression and will then rotate in the opposite direction. The gear train will follow the engine and will therefore stop and then rotate in reverse direction, while the armature of the motor-generator A will, due to its inertia, try to continue to rotate in the original direction. The rotation of the armature and the other parts (crankshaft, gearing) in opposite directions will produce a torque in excess of the maximum which may be transmitted by the torque limiter. The torque limiter will therefore slip until the kinetic energy of the rotor is spent. The momentary reversal of rotation of the gear train will not damage it as such rotation is permitted by the torque limiter.

Means are also provided by the invention for preventing damage to the power-transmitting means C and the electric machine A in the event the engine backfires during or after stopping, which means are also operable to prevent overloading of the generator, as might be caused by short-circuiting the electrical system or device supplied by the generator. Such means comprise the flat, annular spring 100 (see Fig. 3) which is disposed between the rear face of the radially extending clutch part 102 of cone nut 44 and the adjacent end of the sleeve part of the cone nut 46. At its outer periphery the spring is engaged on one face by a flange 104 which is formed on part 102 and on its other face by the end convolution of spring 48. The inner periphery of its opposite face is engaged by the end of the sleeve part of cone nut 46. Normally the spring is not deflected but by reason of its resistance to deformation maintains the adjacent parts of the two cone nuts separated. The two cone nuts may, however, move toward each other by an amount greater than the thickness of the spring and if this occurs the annular spring 100 will be deflected in the manner of a Belleville washer, as shown in Fig. 3.

The operation of the described parts to prevent damage due to backfiring of the engine during or after stopping is as follows.

Upon stopping of the engine a backfire may occur which will cause the crankshaft to fully stop and then rotate in a reverse direction with respect to normal. Such reverse rotation will cause cone nut 44 to run along threads 42 to the right as seen in the drawings, engaging gear 34 and causing the gear train 34, 32, 28, 26 to rotate in a direction which is opposite to normal. The rotor of the motor generator will be brought to a stop after spending its kinetic energy in the torque limiter described above. Then the rotor will be accelerated again in a direction opposite to normal at a speed higher than that of the crankshaft, due to the interposition of the gear train. When the crankshaft stops its reverse rotation, which occurs suddenly upon cessation of the backfire, the inertia of the rotor of the motor-generator causes it to continue to rotate and the resulting relative rotation between shaft 20 and pinion disc 40 causes cone nut 46 to become locked to the pinion disc. The entire assembly consisting of cone nuts 44, 46, pinion disc 40, pinion 26 and the rotor of the motor-generator tries to run along the threads 42 to the left as viewed in the drawings, imposing a high thrust load on the bearing 2 of the motor-generator, acting to the left as viewed in the drawings. When cone nut 44 runs down the thread to the left the flange 104 thereof imposes pressure on the outer periphery of the flat annular spring flexing it and thereby permitting a further movement of the entire described assembly until the end of the sleeve part of cone nut 44 butts against the inner face of pinion disc 40, forcing the pinion disc and attached parts to the left and away from cone nut 46, thereby relieving pressure between surfaces 40 and 46 and causing slippage between these parts. This slippage will limit the torque transmitted from the pinion disc 40 to cone nut 44 through cone nut 46 and the key connection between the two cone nuts. It will therefore be apparent that the thrust which may be transmitted to the motor-generator bearings will be limited by the deflection of spring 100 and that by proper design of this spring the bearing may be fully protected from damage due to loads imposed during reverse rotation of the parts caused by backfire.

The described structure and arrangement of parts will also be effective to limit the amount of electric energy which may be generated by the machine A. This will be of particular importance in the event of a heavy overload on the generator which might be due, for example, to a short-circuit in the electrical system supplied by the generator. In the event of such an overload the torque required to be exerted on the rotor of the generator will increase and will be transmitted through the cone nuts 44, 46 and pinion disc 40. When the torque required by the generator rotor exceeds an amount determined by the strength of spring 100 the parts will slip in the described manner, thus limiting the torque which may be exerted on the rotor and thereby the generator output.

While I have described and illustrated but one embodiment of my invention it will be apparent to those skilled in the art that other embodiments, as well as modifications of that disclosed, may be made without departing in any way from the spirit or scope of the invention, for the limits of which reference must be had to the appended claims.

What is claimed is:

1. An apparatus for drivingly connecting the rotor of an electric machine to an internal combustion engine to start the same and thereafter drivingly connecting the engine to the rotor to generate electricity, comprising a rotatable shaft adapted to be drivingly connected to the crankshaft of an engine, a reduction gearing having an input end gear adapted to be drivingly connected to the rotor of the electric machine, an output end gear freely mounted on said shaft, and intermediate gearing, clutch parts respectively carried by said input and output end gears, a clutch member carried by said shaft between the input and output end gears and comprising two connected clutch parts movable toward and away from each other and respectively operatively disposed with respect to the clutch parts carried by the input and output end gears, means drivingly connecting said clutch member to said shaft and operable by rotation of the input end gear by the rotor on starting to move the clutch member axially of the shaft to move its clutch parts respectively out of engagement with the input end gear clutch part and into engagement with the output end gear clutch part, and operable by rotation of the shaft by the internal combustion engine to move the clutch member axially of the shaft to move its clutch parts respectively into engagement with the input end gear clutch part and out of engagement with the output end gear clutch part, and resilient means disposed between the clutch parts of said clutch member and normally exerting no force thereon but yieldingly opposing movement of said clutch parts of the clutch member toward each other.

2. Apparatus according to claim 1, in which the first clutch means is threaded to the shaft and the second clutch member is splined to the first clutch member for rotation therewith and movement axially thereof.

3. An apparatus for drivingly connecting the rotor of an electric motor to an internal combustion engine to start the same and thereafter drivingly connecting the engine to the rotor to generate electricity, comprising a rotatable shaft adapted to be drivingly connected to the crankshaft of an engine and having a threaded portion, a reduction gearing assembly including an input gear and an output gear both of which are freely and rotatably mounted on the shaft at opposite ends of said threaded portion and have spaced, facing clutch surfaces formed thereon, a clutch member having a sleeve part threaded to the shaft and having a clutch part adapted to move into and out of clutching engagement with the clutch surface on the output gear of the reduction gearing assembly by threading of the clutch member with respect to the shaft, a second clutch member having a part surrounding and splined to the sleeve of the first clutch member for rotation therewith and axial movement with respect thereto and having a clutch part adapted to be moved into and out of clutching engagement with the clutch surface on the input gear, a compression spring disposed between and bearing against the two clutch members, and means disposed between said clutch members and normally exerting no force thereon but being operable to yieldingly oppose movement of said clutch members toward each other.

4. A starter-generator device according to claim 3, in which the last-named means comprises a flat, annular member formed of resilient material.

5. Apparatus according to claim 3, in which the first clutch member has a part extending radially outwardly from the sleeve part having a clutch surface formed on the outer face thereof for engagement with the clutch surface on the output gear of the reduction gearing and having an annular flange on the inner face thereof adjacent the outer periphery thereof against which the yielding means between the clutch members bears.

6. An apparatus for drivingly connecting the rotor of an electric motor to an internal combustion engine to start the same and thereafter drivingly connecting the engine to the rotor to generate electricity, a speed reduction gearing having its input end connected to the rotor of the electric machine, a rotatable shaft adapted to be drivingly connected to the crankshaft of an internal combustion engine, two clutch devices having members which may be respectively connected to the input and output ends of the reduction gearing and the other two members of which are connected to said shaft and for rotation together and relative axial movement into and out of engagement with their co-operating gearing-connected clutch members, means operable by rotation of the rotor to start the engine to shift one shaft-carried clutch member into engagement with the clutch member connected to the output end of the reduction gearing to cause the rotation of the rotor to be transmitted through the reduction gearing to the shaft, said means being also operable by rotation of the shaft by the crankshaft of an engine to move the first-mentioned shaft-carried clutch member to dis-engaged position and to simultaneously move the second shaft-carried clutch member into engaged position to thereby cause the shaft and crankshaft to rotate the rotor without interposition of the reduction gearing, a first resilient means constantly urging both said two shaft-connected clutch members toward clutch-engaged condition, and a second resilient means interposed between said two shaft-connected clutch members and normally exerting no force thereon but being adapted to be deformed upon movement of one clutch member toward the other with sufficient force to cause such deformation.

GERHARD MAURIC.

REFERENCES CITED

The following references are of record in the file of this patent:

UNITED STATES PATENTS

| Number | Name | Date |
|---|---|---|
| 1,916,173 | Lansing | June 27, 1933 |
| 1,942,107 | Lansing | Jan. 2, 1934 |
| 2,466,461 | Mauric et al. | Apr. 5, 1949 |

FOREIGN PATENTS

| Number | Country | Date |
|---|---|---|
| 430,044 | Great Britain | June 12, 1935 |
| 687,056 | France | Apr. 22, 1930 |